United States Patent [19]

Kato

[11] Patent Number: 5,796,774
[45] Date of Patent: Aug. 18, 1998

[54] SPREAD SPECTRUM COMMUNICATION APPARATUS WITH CONVERSION OF INPUT PATTERNS TO UNIFORM SPECTRAL PATTERNS

[75] Inventor: Ichiro Kato, Kawasaki, Japan

[73] Assignee: Canon Kabushiki Kaisha, Tokyo, Japan

[21] Appl. No.: 602,307

[22] Filed: Feb. 16, 1996

[30] Foreign Application Priority Data

Feb. 20, 1995 [JP] Japan ................... 7-055122

[51] Int. Cl.$^6$ .......................................... H04B 1/707
[52] U.S. Cl. .................................. 375/206; 375/260
[58] Field of Search ........................ 375/200, 206, 375/260; 370/320, 335, 342, 441, 479

[56] References Cited

U.S. PATENT DOCUMENTS

| | | | |
|---|---|---|---|
| 3,518,547 | 6/1970 | Filipowsky | 375/200 |
| 3,519,746 | 7/1970 | Gutleber | 370/479 |
| 4,958,359 | 9/1990 | Kato | 375/1 |
| 5,199,045 | 3/1993 | Kato | 375/1 |
| 5,204,877 | 4/1993 | Endo et al. | 375/200 |
| 5,467,367 | 11/1995 | Izumi et al. | 375/206 |
| 5,504,775 | 4/1996 | Chouly et al. | 370/210 |
| 5,537,396 | 7/1996 | Kanda et al. | 370/479 |
| 5,555,268 | 9/1996 | Fattouche et al. | 375/206 |

OTHER PUBLICATIONS

U.S. Patent Application, Serial No. 08/233,244.

*Primary Examiner*—Stephen Chin
*Assistant Examiner*—Jeffrey W. Gluck
*Attorney, Agent, or Firm*—Fitzpatrick, Cella, Harper & Scinto

[57] ABSTRACT

A spread spectrum communication apparatus, which can convert a specific pattern into a pattern whose spectrum becomes uniform even if the specific pattern is input, comprises process means for processing parallel data using a plurality of spread codes, and communication means, connected to said process means, for communicating the parallel data processed by the plurality of spread codes, whereby transfer quality can be improved.

18 Claims, 14 Drawing Sheets

SPREAD SPECTRUM COMMUNICATION APPARATUS WITH CONVERSION OF INPUT PATTERNS TO UNIFORM SPECTRAL PATTERNS

BACKGROUND OF THE INVENTION

1. Field of the Invention

The present invention relates to a spread spectrum communication apparatus which performs a code-division multiple communication by using different spread codes.

2. Related Background Art

Hitherto, in a spread spectrum communication system utilizing a direct spread manner, a baseband signal having an extremely wide bandwidth as compared with original data is generated from a baseband signal of an ordinarily transferred digital signal at a transmission side by using a spread code series-such as a pseudo noise code (PN code) or the like. Further, this signal is converted into an RF (radio frequency) signal by performing such modulation as PSK (phase shift keying), FSK (frequency shift keying) or the like, and then transferred.

At a reception side, a reception signal is converted into a narrow-band signal having a bandwidth corresponding to the original data by performing an inverse spread. In the inverse spread, a correlation with the reception signal is obtained by using a spread code the same as that of the transmission side. Then, an ordinary data demodulation is performed to reproduce the original data.

In this fashion, in the spread spectrum communication system, since a transmission bandwidth is extremely wide for an information bandwidth, only an extremely low transference speed can be realized as compared with an ordinary narrow-band modulation system, on condition that the transmission bandwidth is limited to a certain width.

In order to solve the above-mentioned problem, a code-division multiplexing system has been proposed. In this system, a high-speed information signal is converted into low-speed parallel data, then the converted parallel data are respectively spread-modulated by different spread code series and are added to others. Thereafter, the added data is converted into the RF signal and transferred, thereby realizing a high-speed data transference on the condition of constant transmission bandwidth, without decreasing a spread ratio of spread modulation.

FIG. 3 is a block diagram showing the structure of a transmitter in this system.

Input data is converted into n parallel data in a serial/parallel converter 301. Converted data are respectively multiplied by n different spread code outputs from a spread code generator 303 in n multipliers 302-1 to 302-n to be converted into wide-band spread signals of n channels.

Then, outputs from the multipliers 302 are added to others in an adder 304 and then output to a high-frequency stage 305. The added baseband wide-band spread signal is converted into a transmission frequency signal having an appropriate central frequency and then transmitted through a transmission antenna 306.

FIG. 4 is a block diagram showing the structure of a receiver.

A signal received at an antenna 401 is appropriately filtered and amplified in a high-frequency signal process unit 402 to be converted into an intermediate frequency signal. The intermediate frequency signal is distributed into channels which respectively correspond to n spread code generators connected in parallel. In each channel, an input signal is detected correlatively with each of outputs from spread code generators 404-1 to 404-n, each output corresponding to the channel in correlators 403-1 to 403-n, thus performing inverse spreading.

The inverse spread signals are synchronized for the respective channels in synchronization circuits 405-1 to 405-n to cause a code phase to coincide with a clock in each spread code generator. The inverse spread signals are further demodulated in demodulators 406-1 to 406-n to reproduce data, respectively. Then, the reproduced data are converted into serial data in a parallel/serial converter 407 to reproduce the original information.

However, in the above-mentioned prior art, when specific patterns are sequentially input, there occurs a problem in which a spectrum of a multiplexed high-frequency signal is not uniform and becomes weak in noise.

SUMMARY OF THE INVENTION

An object of the present invention is to improve transference quality.

Another object of the present invention is to provide a spread spectrum communication apparatus which is capable of converting, even if a specific pattern is input, the specific pattern into a uniform spectrum pattern.

Still another object of the present invention is to improve a transference quality without relatively increasing circuit scale.

The above and other objects of the present invention will become apparent from the following description of embodiments and the attached drawings.

DETAILED DESCRIPTION OF THE PREFERRED EMBODIMENTS

Figure 1:
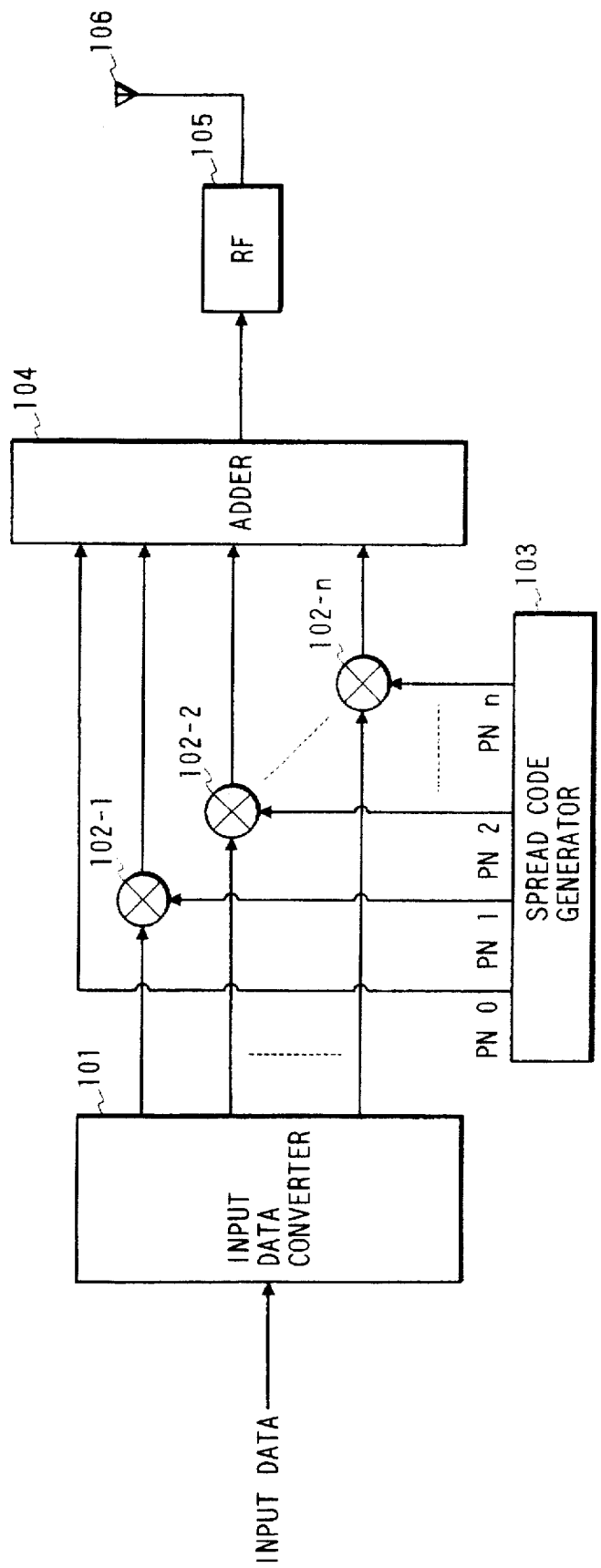
FIG. 1 is a block diagram showing the structure of a transmitter in a first embodiment of the present invention.

FIG. 1 is a block diagram showing the structure of a transmitter in a first embodiment of the present invention.

Figure 2:
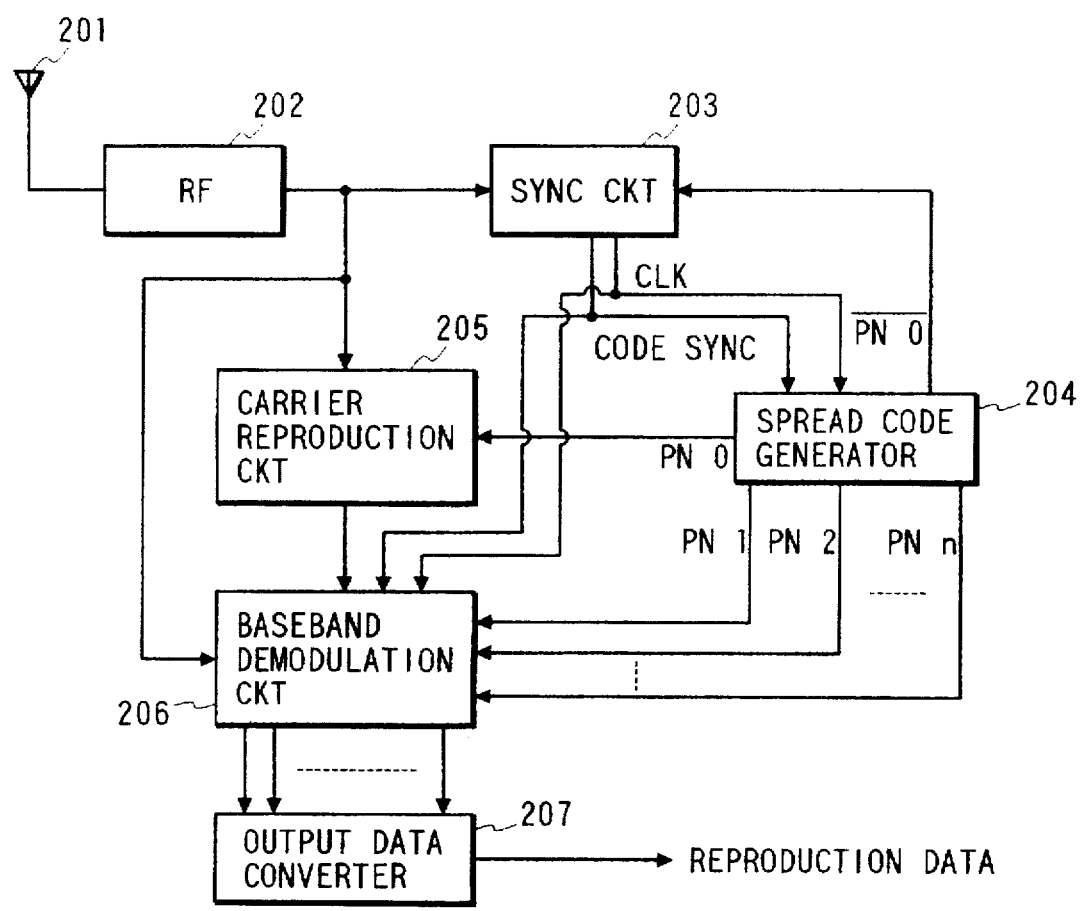
FIG. 2 is a block diagram showing the structure of a receiver in the first embodiment.
Figure 3:
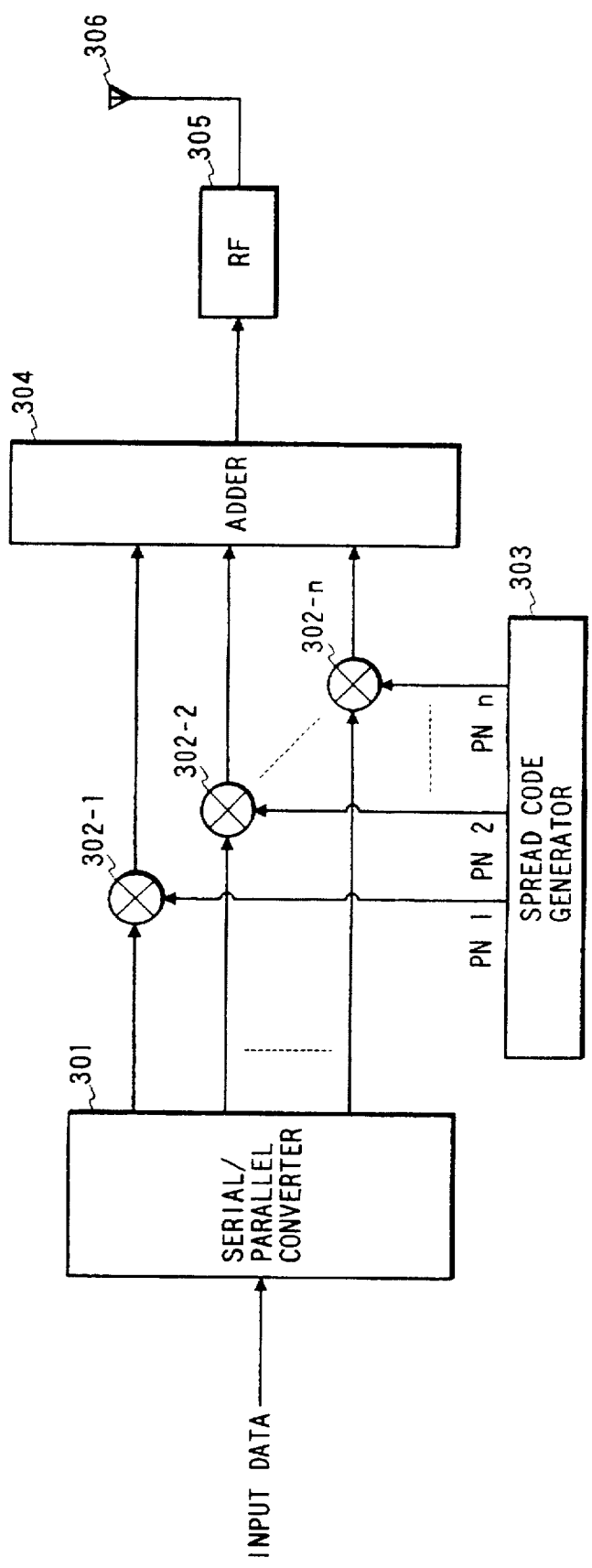
FIG. 3 is a block diagram showing the structure of a conventional transmitter.
Figure 4:
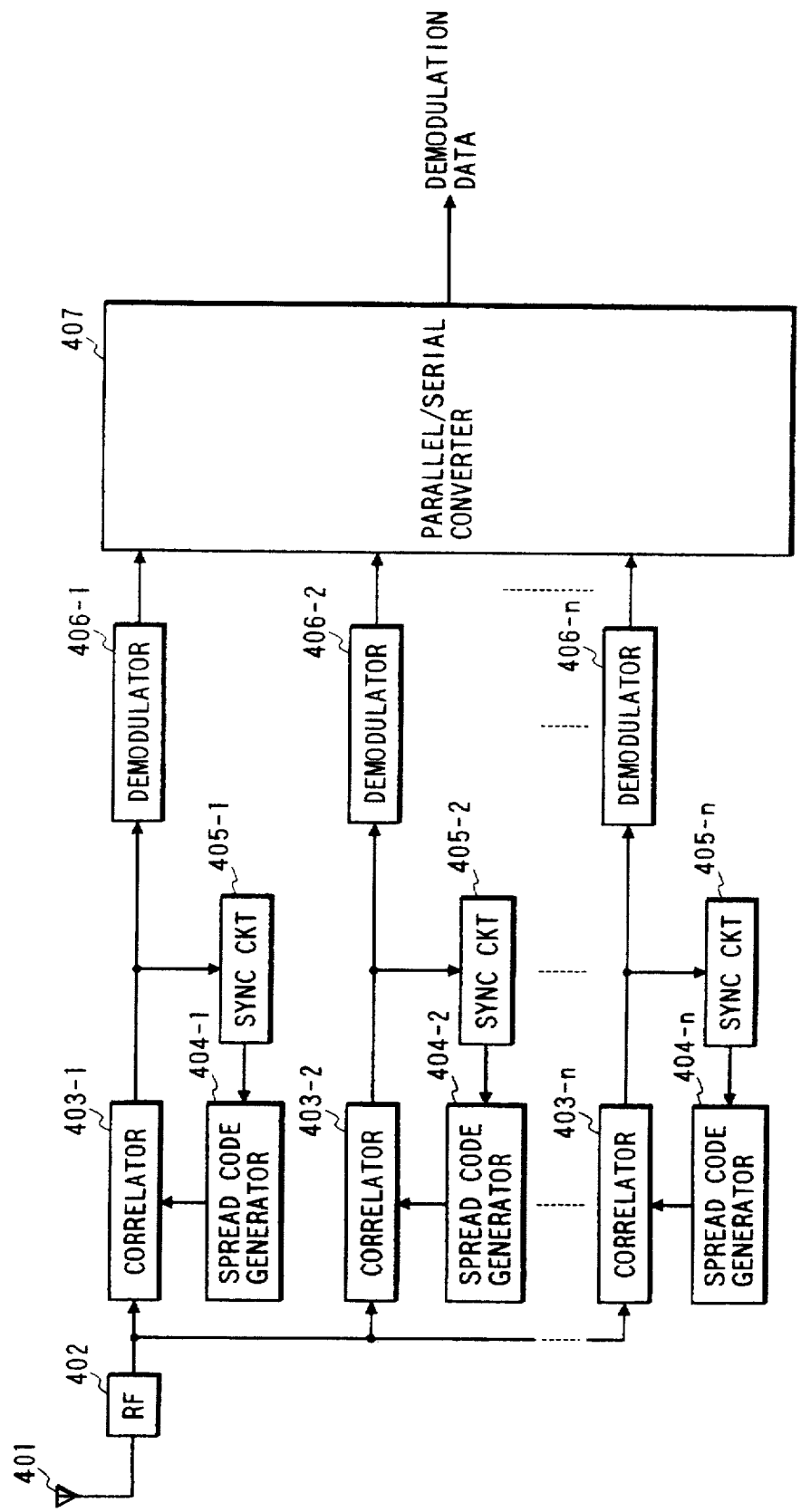
FIG. 4 is a block diagram showing the structure of a conventional receiver.

FIG. 2 is a block diagram showing the structure of a receiver in the first embodiment.

In FIG. 1, at first, an input data converter 101 converts data which is input in serial into n first parallel data, then a predetermined one-to-one mapping conversion is performed to convert the n data into n second parallel data. Multipliers 102-1 to 102-n multiply the obtained parallel data by n spread codes output from a spread code generator 103.

The spread code generator 103 generates different (n+1) spread codes (including a spread code PNO for synchronization). An adder 104 adds the spread code PNO for synchronization which is output from the spread code generator 103 and n outputs from the multipliers 102-1 to 102-n. A high-frequency stage 105 converts an output from the adder 104 into a transmission frequency signal. A transmission antenna 106 transmits an output from the high-frequency stage 105 as a radio wave.

In FIG. 2, a reception antenna 201 receives the radio wave. A high-frequency signal process unit 202 performs such processes as filtering or amplification for a received high-frequency signal. A synchronization circuit 203 captures and maintains a synchronization for a spread code and a clock at a transmission side. A spread code generator 204 generates (n+1) spread codes which are the same as those of the transmission side using a code synchronization signal and a clock signal which are input from the synchronization circuit 203.

A carrier reproduction circuit 205 reproduces a carrier signal from the spread code PNO for carrier reproduction output from the spread code generator 204 and an output from the high-frequency signal process unit 202. A baseband demodulation circuit 206 performs a demodulation to baseband by using an output from the carrier reproduction circuit 205, an output from the high-frequency signal process unit 202 and n spread codes PN1 to PNn being outputs from the spread code generator 204.

An output data converter 207 performs an inverse conversion of the one-to-one mapping conversion on the n first parallel demodulation data, which are outputs from the baseband demodulation circuit 206, to produce second parallel demodulation data, to which a parallel/serial conversion is performed.

In the above constitution, at the transmission side, input data is first converted into n first parallel data, the number of which is equal to a code-division multiplex number, by the input data converter 101. Then, the parallel data are converted into second parallel data in accordance with a predetermined one-to-one mapping conversion rule.

Figure 7:
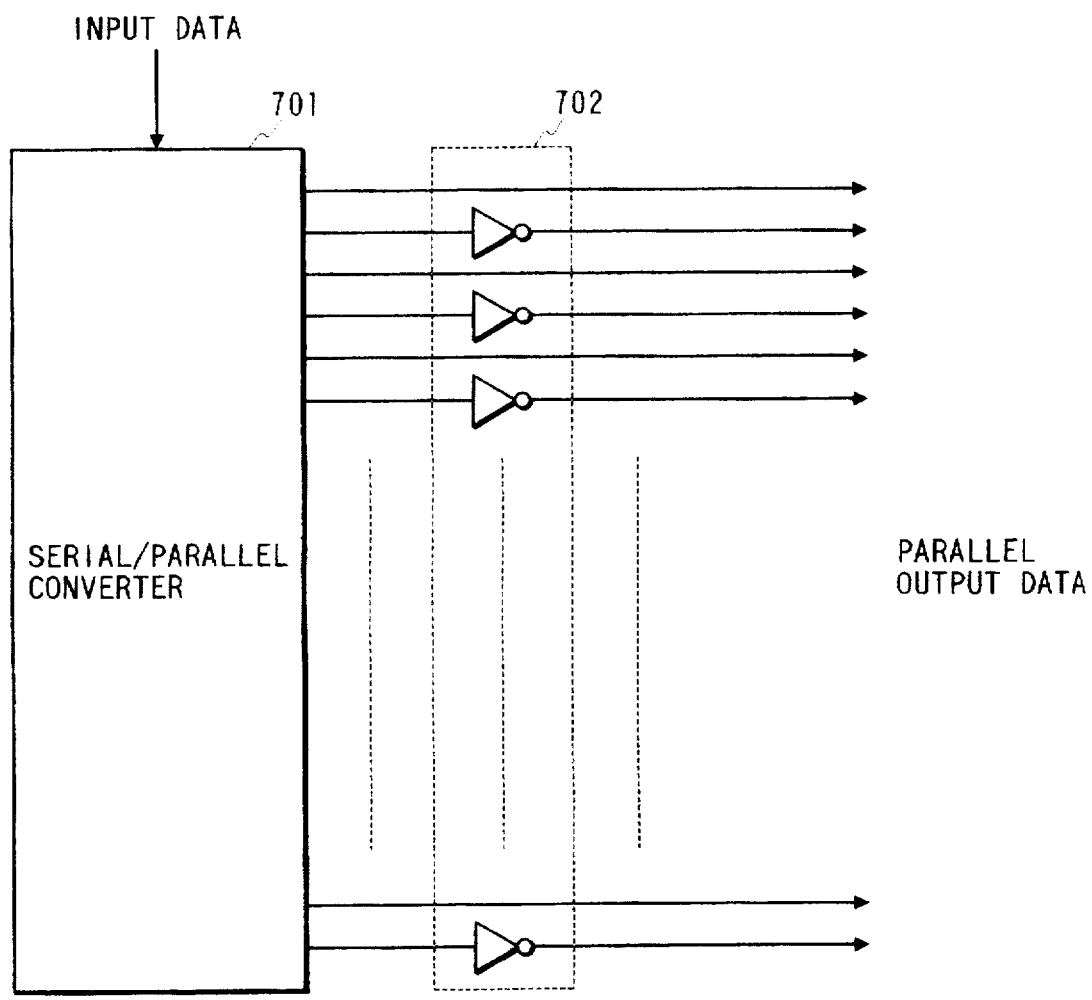
FIG. 7 is a block diagram which indicates an input data converter in the first embodiment.

The input data converter 101 has, for example, a structure shown in FIG. 7. Input serial data is first converted by a serial/parallel converter 701 into n parallel data the number of which is equal to the code-division multiple number. Then, the parallel data are input to a data converter 702. The data converter 702 outputs data of odd order of the input parallel data as is, and outputs data of even order after inverting its polarity by an inverter.

Accordingly, it is possible to convert a pattern of all "1" or all "0" which ordinarily frequently appears in serial input data into such an alternate pattern as "1010 . . . ". As a result, it is possible to avoid non-uniformity of transmission spectrum which is produced by multiplexing the pattern of all "1" or all "0" as is.

It should be noted that the inversion of polarity of parallel data is not limited to data of even order. By performing the inversion on a number of data bits equal to or greater than 1 and less than all data bits, the same effect can be obtained.

As to a selection what data should be inverted, it is determined based on spread codes PN0 to PNn and frequently-transmitted data. That is, the above determination is performed such that a spectrum of a signal which is obtained by spreading the frequently-transmitted data with the spread codes PN0 to PNn and synthesizing them becomes as uniform as possible.

On the other hand, the spread code generator 103 generates the different (n+1) spread codes PN0 to PNn having the same code period. Among these codes, the spread code PN0 is used for the synchronization and the carrier reproduction, and it is not modulated by the parallel data but is directly input to the adder 104. The remaining n spread codes are modulated by n parallel data in multipliers 102-1 to 102-n to be input to the adder 104.

The adder 104 linearly adds input (n+1) signals and outputs an added baseband signal to the high-frequency stage 105. It should be noted that the data converter 702, the multipliers 102, the spread code generator 103, the adder 104 can be gathered in a table conversion memory which outputs an output of the adder 104 upon inputting an output of the serial/parallel converter 701. The baseband signal is then converted into a high-frequency signal having an appropriate central frequency at the high-frequency stage 105 to be transmitted through the transmission antenna 106.

At a reception side, a signal received at the reception antenna 201 is appropriately filtered and amplified in the high-frequency signal process unit 202 and is output in the transmission frequency band, or is converted to an appropriate intermediate frequency band signal. The signal is input to the synchronization circuit 203, in which a spread code synchronization and a clock synchronization for a transmission signal are established by using a reference spread code PN0 input from the code generator 204, and the code synchronization signal and the clock signal are output to the spread code generator 204. The reference spread code PN0 is a code obtained by time-inverting a spread code for synchronization at the transmission side, in a case where a convolver is used in the synchronization.

The synchronization circuit 203 and the code generator 204 entirely constitute a kind of phase-lock-loop. In such a state as the synchronization is not established, since there is a phase difference between a correlation peak signal and a spread code start signal, a spread code clock is advanced (or delayed), whereby the phase difference between a spread code component for the synchronization included in a reception signal and the reference spread code is slowly decreased. When both phases coincide with each other, that is, after the phase difference becomes "0", this phase difference is controlled to remain "0".

After establishing the synchronization, the spread code generator 204 generates the spread codes PN0 to PNn, whose clocks and spread code phases for the spread codes at the transmission side are made to coincide. Among these codes, the spread code PN0 for synchronization is input to the carrier reproduction circuit 205. In the carrier reproduction circuit 205, a reception signal converted into a transmission frequency band or an intermediate frequency band being an output from the high-frequency signal process unit 202 is inverse spread by the spread code PN0 for synchronization to reproduce a carrier of the transmission frequency band or the intermediate frequency band.

Figure 5:
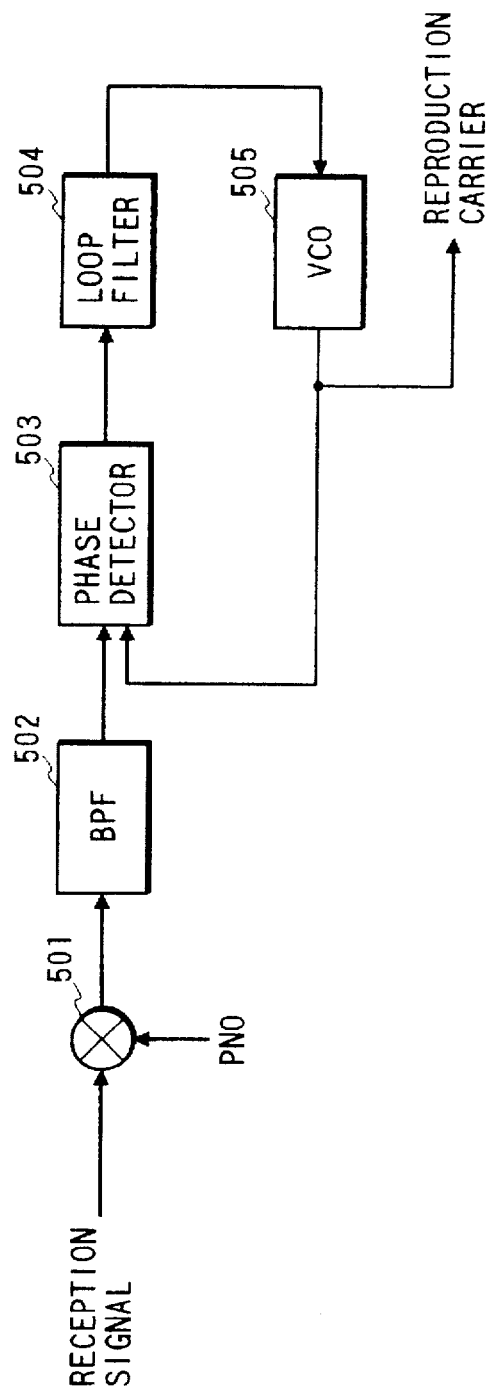
FIG. 5 is a block diagram which indicates a carrier reproduction circuit.

As the carrier reproduction circuit 205, a circuit utilizing the phase-lock-loop, for example, shown in FIG. 5, is used. In FIG. 5, the reception signal is multiplied by the spread code PN0 for synchronization in a multiplier 501. After establishing the synchronization, clocks and code phases of the spread code for synchronization coincide with those of the reference spread code for synchronization, in the reception signal. Since the transmission-side spread code for synchronization is not modulated by data, an inverse spread is performed in the multiplier 501 to obtain an output in which a carrier component appears. The output is then input to a band-pass-filter 502 to eliminate the carrier component and is output.

Then, the output is input to the phase-lock-loop consisting of a phase detector 503, a loop filter 504 and a voltage control oscillator 505, and a signal is phase locked with the carrier component. Thereafter, a signal whose phase is locked into the carrier component output from the band-pass-filter 502 is output from the voltage control oscillator 505, as a reproduced carrier.

The reproduced carrier is input to the baseband demodulation circuit 206, in which a baseband signal is produced from this reproduction carrier and an output from the high-frequency signal process unit 202. The baseband signal is distributed to n branches, which are then inverse spread for every code-division channel by the spread codes PN1 to PNn output from the spread code generator 204, and are data demodulated.

Figure 6:
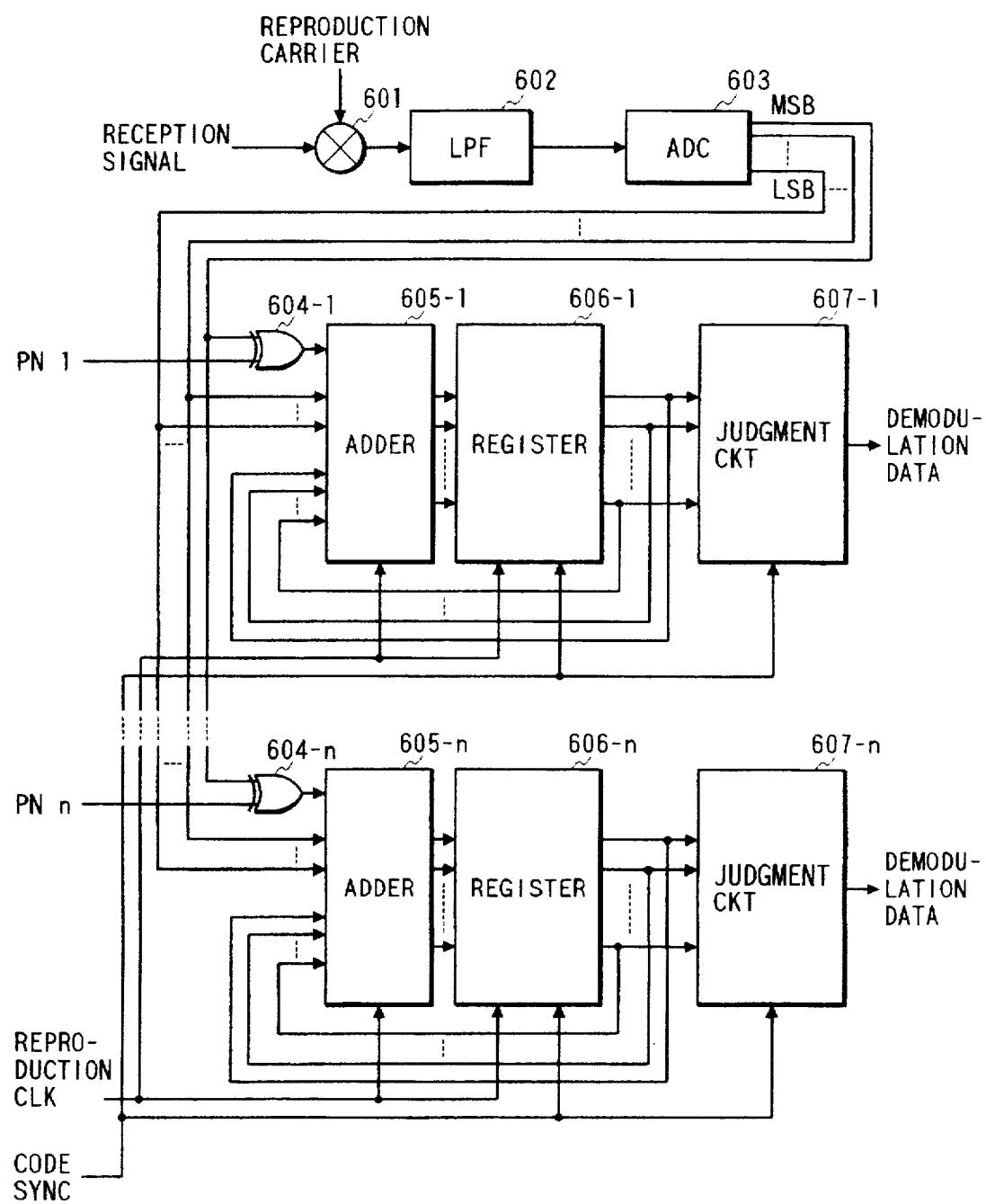
FIG. 6 is a block diagram which indicates a baseband demodulation circuit.

The baseband demodulation circuit 206 is, for example, constituted as shown in FIG. 6. In FIG. 6, an input reception signal is multiplied by the reproduction carrier in a multiplier 601, thus converting the reception signal into the baseband signal, and extraneous signals are eleminated by a low-pass-filter 602. The baseband signal is converted into a digital signal having a resolution of one bit or plural bits in an A/D converter 603 having a reproduction clock as a sample period.

The digital signal is distributed to n branches. In each branch, a most significant bit (code bit) of the digital signal is exclusive ORed with each of the spread codes PN1 to PNn output from the spread code generator 204 in exclusive OR circuits 604-1 to 604-n, whose outputs are input to adders 605-1 to 605-n together with other bits. In the adders 605-1 to 605-n, the input signals are added to outputs of registers 606-1 to 606-n at each reproduction clock pulse, and the results are output to the registers 606-1 to 606-n, respectively.

The registers 606-1 to 606-n are reset when a head bit of each spread code is input. Thereafter, an added result of the product of the reception signal with the spread code is input for one period of spread code.

Therefore, when a final bit for the one period of spread code is input, a correlation value with each spread code for one period and the reception signal is to be stored in the registers 606-1 to 606-n. By performing data judgements on the correlation values in judgement circuits 607-1 to 607-n, n parallel demodulation data can be obtained. The inverse conversion of the one-to-one mapping conversion, which mapping conversion is performed in the input data converter 101, is performed on the demodulated n parallel demodulation data in the output data converter 207. Then, the n parallel demodulation data are converted into serial data to be output.

Figure 8:
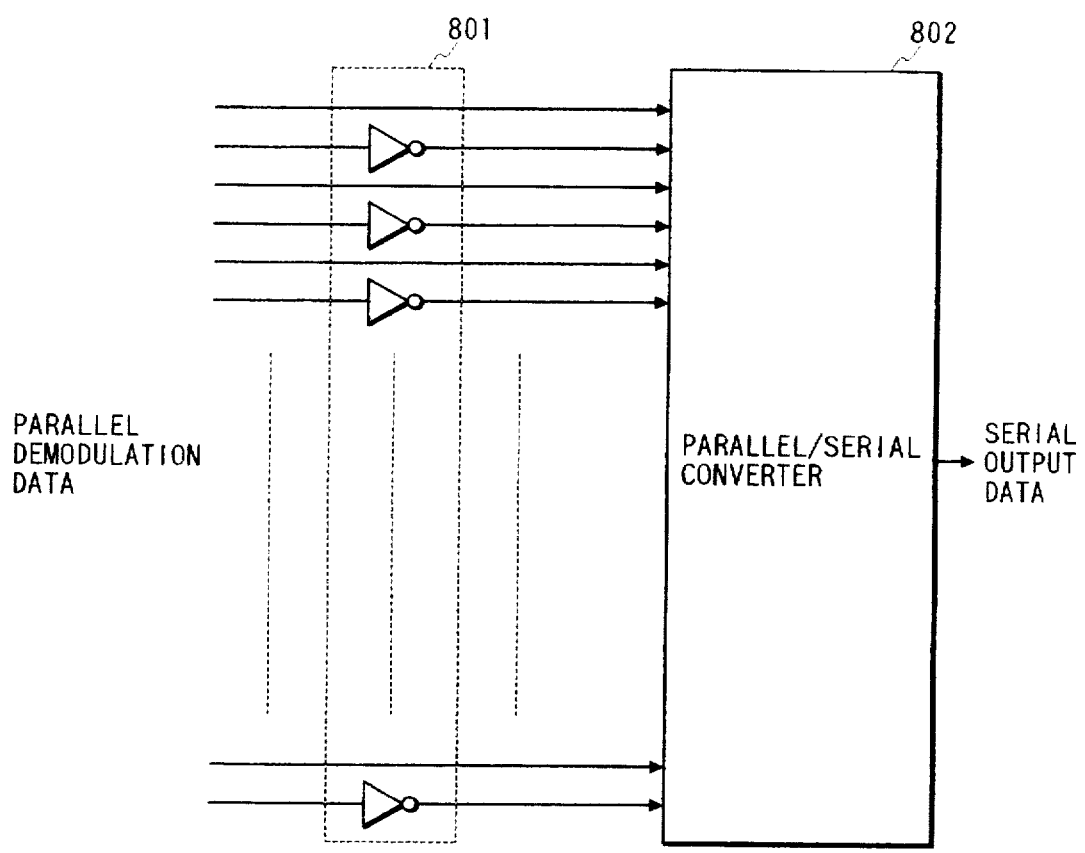
FIG. 8 is a block diagram which indicates an output data converter in the first embodiment.

As the output data converter 207, a circuit, for example, shown in FIG. 8 is used. The parallel demodulation data are input to a data inverse converter 801. The data inverse converter 801 outputs data of odd order of the input parallel data as is, and outputs data of even order after inverting its polarity in an inverter.

Accordingly, the inverse conversion of the one-to-one mapping conversion, which was performed at the transmission side, is performed, and the data prior to conversion reproduced. Then, the parallel data being outputs from the data inverse converter 801 are converted into serial data by a parallel/serial converter 802 and are output as a demodulation data sequence.

When an error occurs in reception data, since a calculation among the reception data is never performed in the above sequential mapping conversion and the inverse conversion, an error of one symbol does not influence other symbols. As a result, communication quality does not deteriorate.

(Second Embodiment)

Next, a second embodiment of the present invention will be described.

In the above first embodiment, a polarity inversion of data is utilized for a one-to-one mapping conversion which is performed at a transmission side and a reception side. However, in the second embodiment, in addition to the polarity inversion of data, scrambling is used for the one-to-one mapping conversion. Since other constitutions are same as those of the above-mentioned first embodiment, the description thereof will be omitted, and a difference point will be described in detail.

Figure 9:
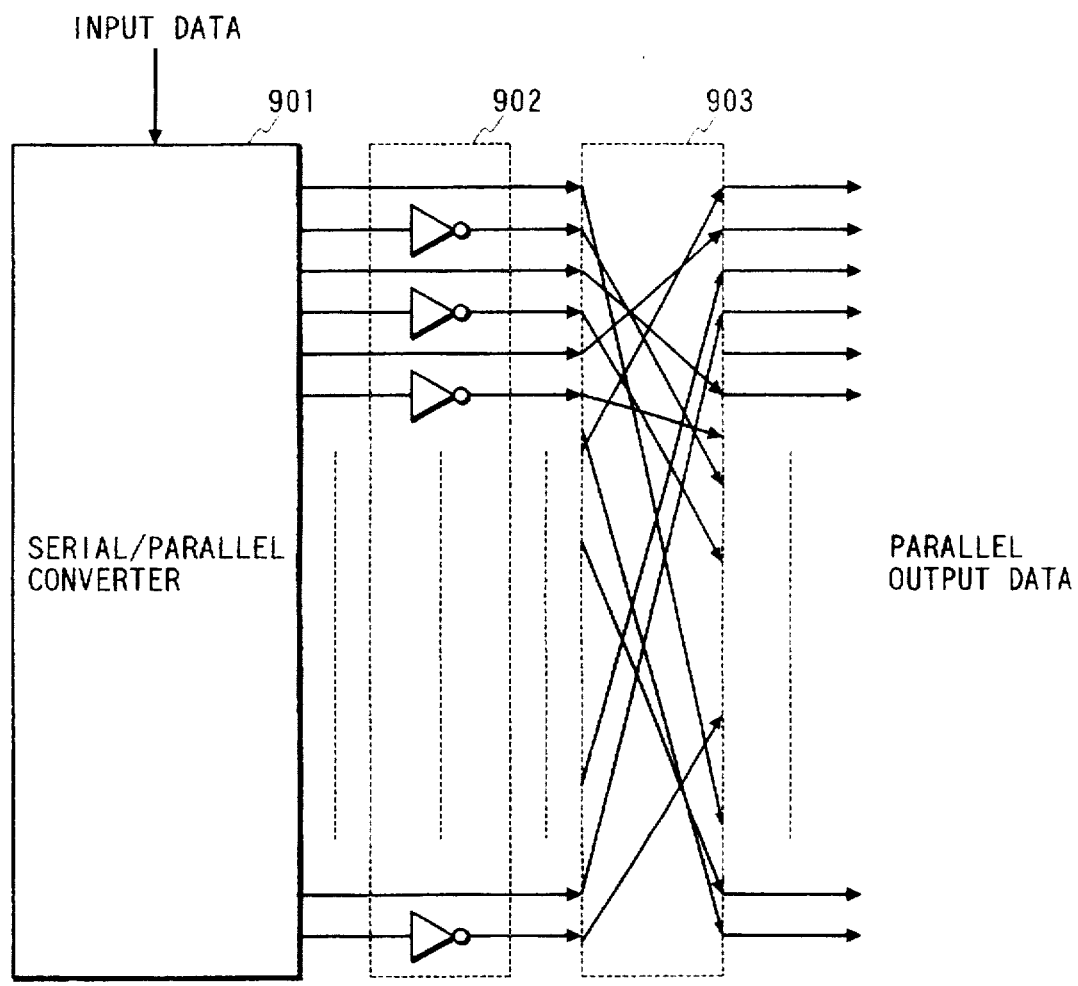
FIG. 9 is a block diagram which indicates an input data converter in a second embodiment of the present invention.

FIG. 9 is a block diagram of an input data converter at the transmission side in the second embodiment.

Input serial data is converted into n parallel data the number of which is equal to a code-division multiplex number, in a serial/parallel converter 901. The parallel data are then input to a first data converter 902. The first data converter 902 outputs data of odd order of the input parallel data as is, and outputs data of even order after inverting its polarity by an inverter.

Accordingly, it is possible to convert a pattern of all "1" or all "0" which ordinarily frequently appears in serial input data, into such an alternate order pattern as "1010 . . . ". Then, the parallel data output from the first data converter 902 are input to a second data converter 903. In the second data converter 903, scrambling is performed by replacing mutual positions of the input parallel data in accordance with a preset rule. Accordingly, even if the series of all "1" or all "0" are frequently input in the serial input data, since patterns depending on outputs from the second data converter 903 become almost random, it is possible to avoid non-uniformity of a transmission spectrum. The outputs of the second data converter 903 are input to multipliers 102-1 to 102-n.

Figure 10:
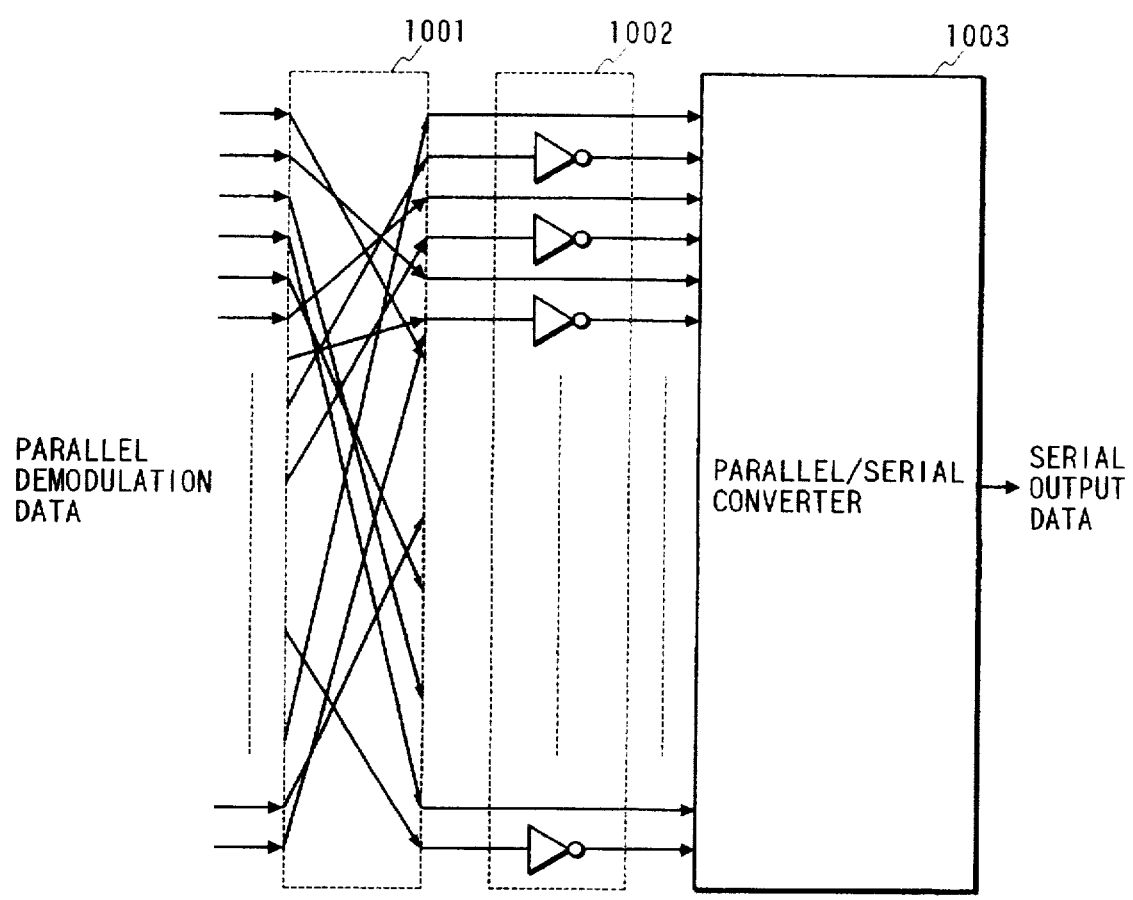
FIG. 10 is a block diagram which indicates an output data converter in the second embodiment.

FIG. 10 is a block diagram of an output data converter at the reception side in the second embodiment.

Parallel demodulation data input from a baseband demodulation circuit 206 are input to a first data inverse converter 1001. In the inverse converter 1001, an inverse conversion of the scrambling, which is performed in the second data converter 903 at the transmission side, is performed to the parallel input data.

That is, a conversion for returning positions of the parallel data to a state before performing a mutual data replacement in the second data converter 903 at the transmission side is performed. Then, outputs from the first data inverse converter 1001 are input to a second data inverse converter 1002. The second data inverse converter 1002 outputs data of odd order of the input parallel data as is, and outputs data of even order after inverting its polarity by the inverter.

Accordingly, the inverse conversion of a conversion, which was performed in the first data converter 902 at the transmission side, was performed, and input parallel data of the first data converter 902 at the transmission side is reproduced. Then, the parallel data being output from the second data inverse converter 1002 are converted into serial data by a parallel/serial converter 1003 and are output as a demodulation data sequence.

(Third Embodiment)

Next, a third embodiment of the present invention will be described.

In the first and second embodiments, input data before inputting to multipliers 102-1 to 102-n is converted in an input data converter 101. However, in the present embodiment, spread codes PN1 to PNn are adjusted before inputting to the multipliers 102. For that purpose, a data converter 702 shown in FIG. 7 may be provided between a spread code generator 103 and the multipliers 102, instead of providing it between a serial/parallel converter 701 and the multipliers 102. Further, a data inverse converter 801 shown in FIG. 8 may be provided between a code generator 204 and a baseband demodulation circuit 206, instead of providing it between the baseband demodulation circuit 206 and a parallel/serial converter 802. First and second data converters 902 and 903 shown in FIG. 9, and first and second data inverse converters 1001 and 1002 shown in FIG. 10 may be provided.

Figure 11:
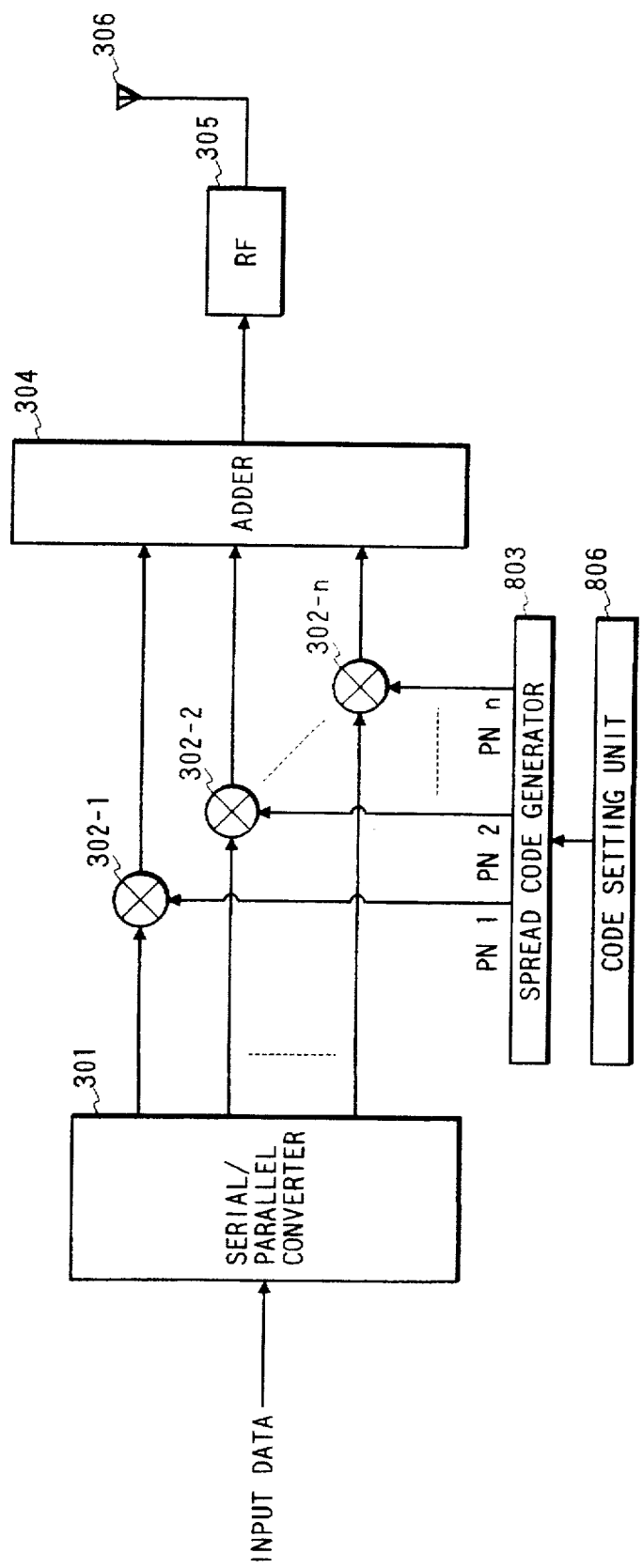
FIG. 11 is a block diagram showing the structure of a transmitter in a third embodiment of the present invention.
Figure 12:
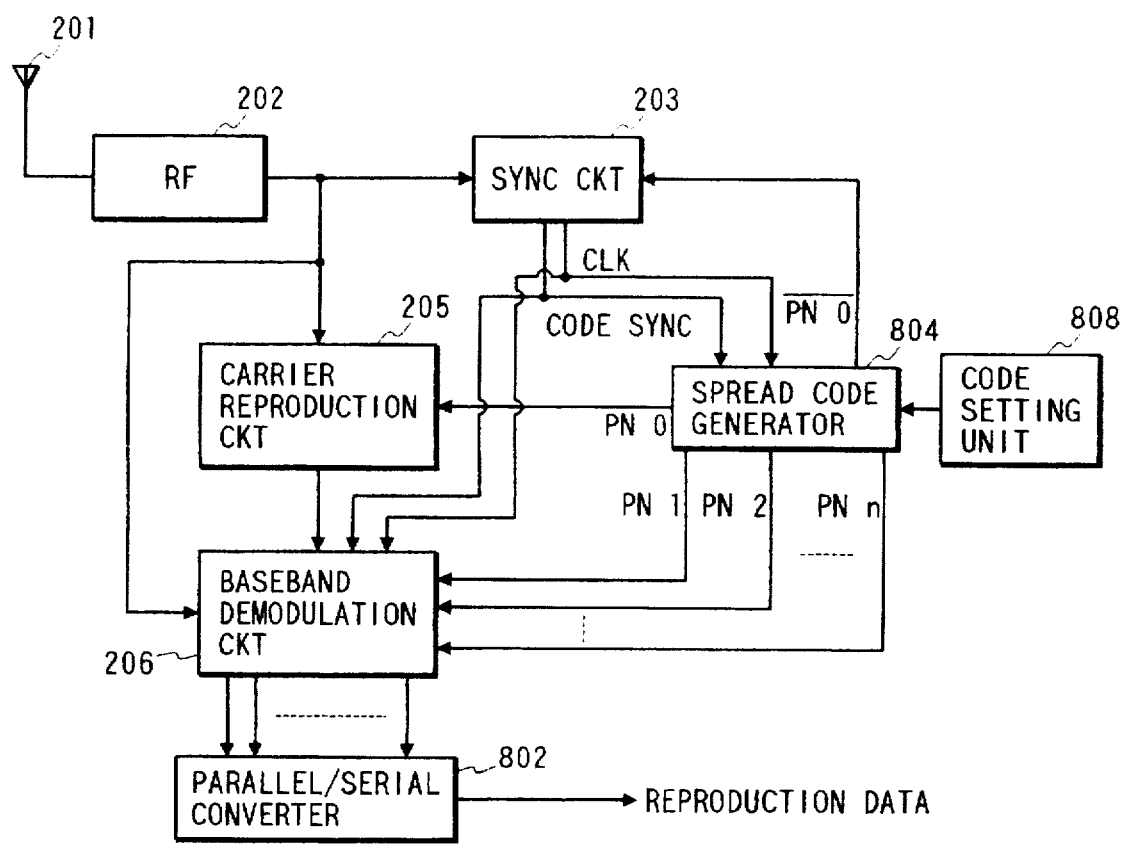
FIG. 12 is a block diagram showing the structure of a receiver in the third embodiment.

As shown in FIGS. 11 and 12, codes generated from code generators 803 and 804 may be arbitrarily set externally by an operator using code setting units 806 and 808. In this manner, a spectrum of sequentially communicated data which appears frequently can be maintained uniform in accordance with an actual use condition.

As described in the first embodiment, in a system which converts input data, a conversion rule of a one-to-one mapping conversion can also be changed in accordance with the actual use condition.

(Fourth Embodiment)

Figure 13:
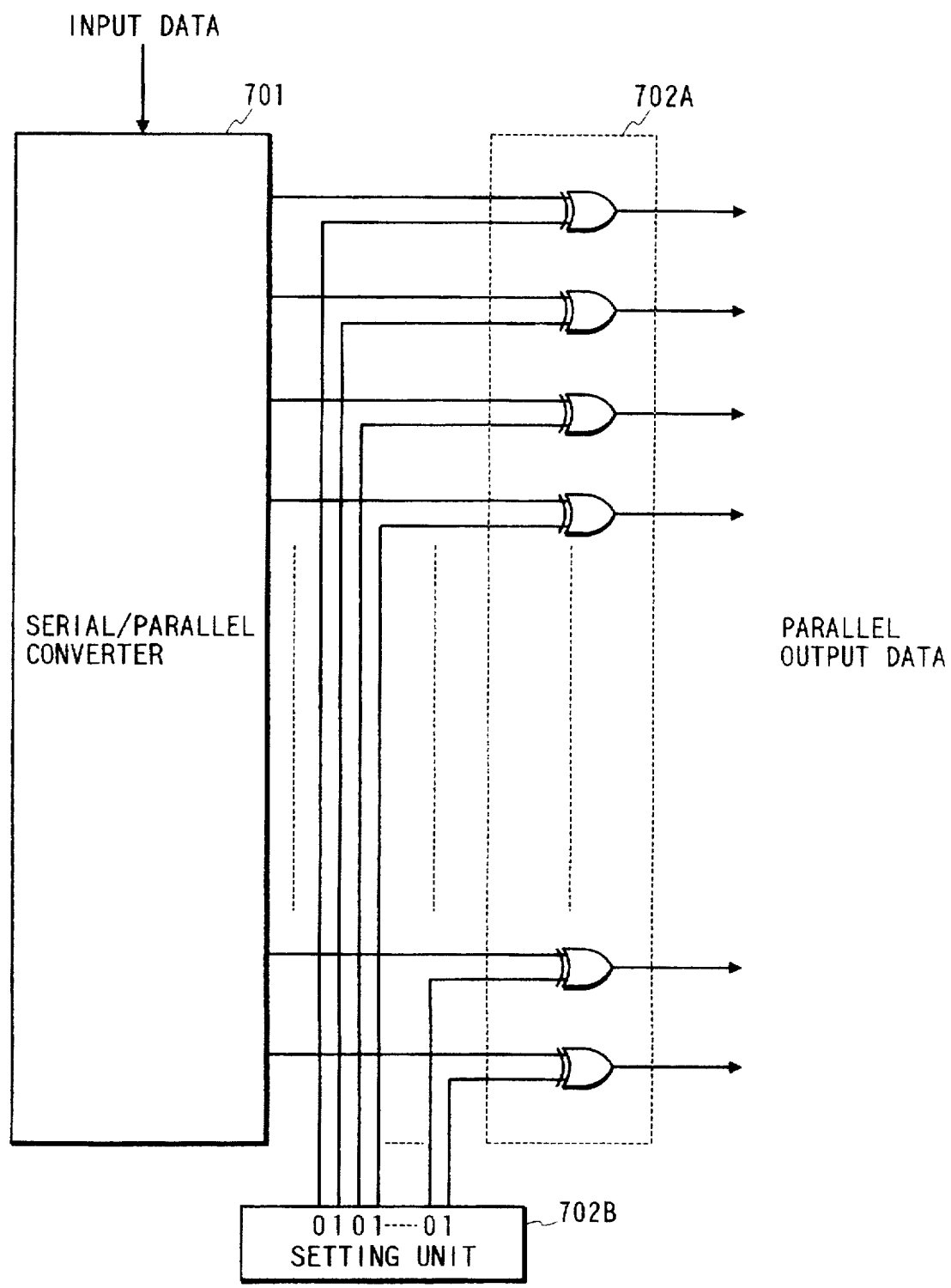
FIG. 13 is a block diagram which indicates an output data converter in a fourth embodiment of the present invention.
Figure 14:
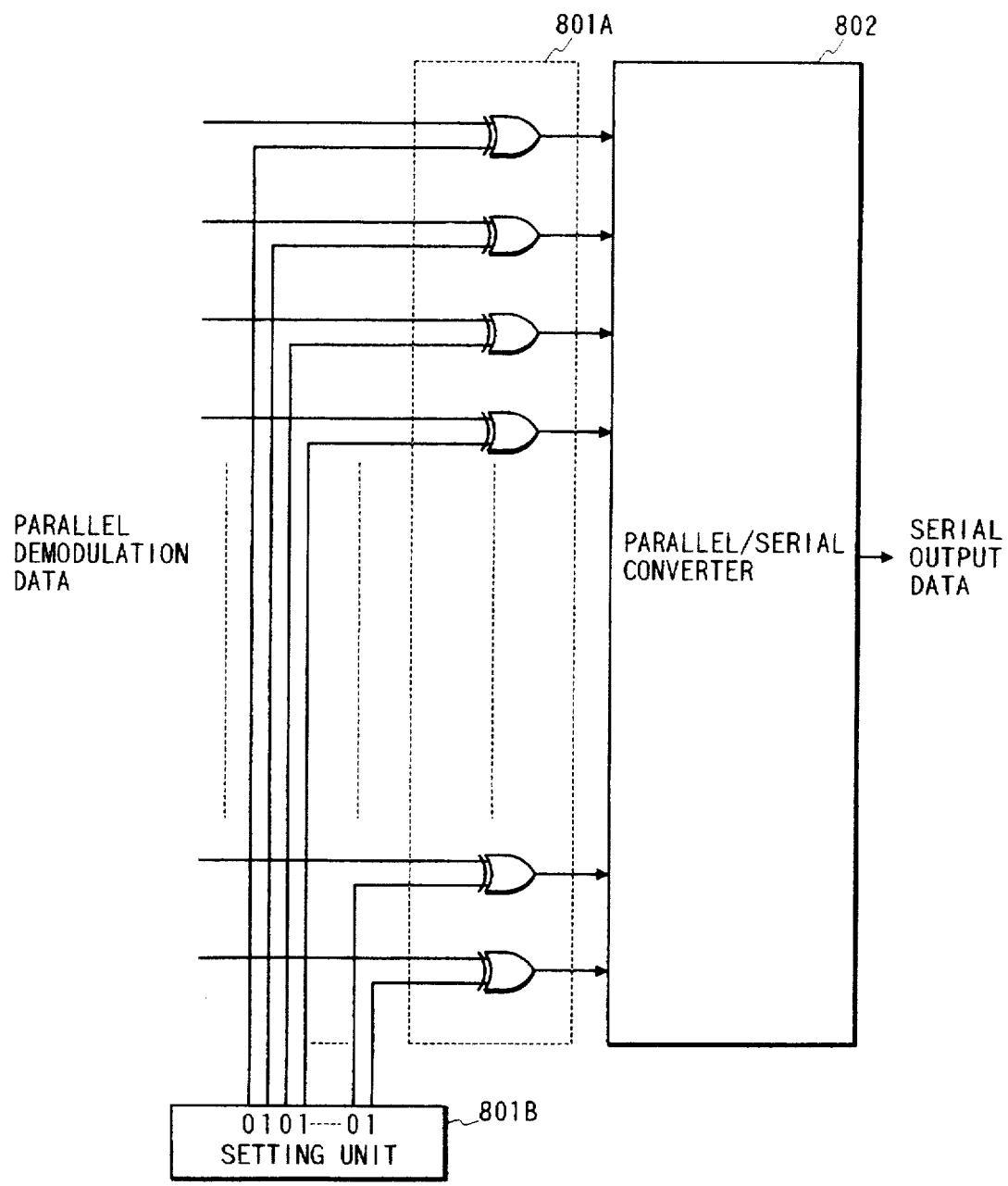
FIG. 14 is a block diagram which indicates an input data converter in the fourth embodiment.

FIGS. 13 and 14 show a configuration of an input data converter 101 and an output data converter 207 in a fourth embodiment, in the above-mentioned case. Other configurations are common to those of FIGS. 1 and 2.

A data converter 702A and a data inverse converter 801A consist of exclusive OR circuits, respectively. In the present embodiment, the data converter 702A is set to output data of odd order of the input parallel data as is and to output data of even order after inverting its polarity, in response to setting data from a setting unit 702B. An operator can arbitrarily change a conversion rule of a one-to-one mapping conversion externally by using the setting unit 702B. The data inverse converter 801A has been preset, by a setting unit 801B, to perform an inverse conversion of the one-to-one mapping conversion, which is performed by the data converter 702A at a transmission side. In the present embodiment, the data inverse converter 801A outputs data of odd order of the input parallel data as is, and outputs data of even order after inverting its polarity. Accordingly, the inverse conversion of the one-to-one mapping conversion, which was performed at the transmission side, is performed. Therefore, data before converting at the transmission side is reproduced. It should be noted that an inverse conversion rule of the data inverse converter 801A is set by the operator in the setting unit 801B in accordance with setting data set in the setting unit 702B at the transmission side.

A second data converter 903 shown in FIG. 9 and a second data inverse converter 1002 shown in FIG. 10 may be constituted in the same manner as those of the data converter 702A and the data inverse converter 801A, respectively.

As explained above, the present invention has been described based on the preferred embodiments. However, the present invention is not limited to the above-mentioned embodiments, so that various modifications are possible within the spirit and scope of the appended claims.

What is claimed is:

1. A spread spectrum communication method comprising the steps of:

processing parallel data;

spreading each of the parallel data processed in said processing step, using a different spread code; and communicating the parallel data, each of which is spread using the spread code, wherein the parallel data is processed in said processing step such that a spectrum of a signal communicated in said communicating step becomes uniform.

2. A method according to claim 1, wherein in said processing step a one-to-one mapping conversion is performed on the data, which is to be communicated, such that the spectrum of the signal becomes uniform.

3. a method according to claim 2, wherein a conversion rule of a mapping conversion is desirably set.

4. A method according to claim 1, wherein in said processing step predetermined bits of data included in the parallel data are inverted such that the spectrum of the signal becomes uniform.

5. A method according to claim 4, wherein the bits to be inverted are desirably set.

6. A method according to claim 4, wherein the parallel data is scrambled in said processing step.

7. A method according to claim 1, wherein the plurality of spread codes are desirably set.

8. A method according to claim 1, wherein the parallel data are processed in said processing step such that a spectrum, when parallel data frequently and continuously communicated are spread, becomes uniform.

9. A method according to claim 1, wherein the parallel data are processed in said processing step such that the spectrum of the signal becomes uniform when predetermined data is communicated.

10. A spread spectrum communication apparatus comprising:

process means for processing parallel data;

spread means for spreading the parallel data processed by said process means using a plurality of spread codes; and communication means for communicating the parallel data spread using the plurality of spread codes, wherein said process means processes the parallel data such that a spectrum of a signal, which is communicated by said communication means, becomes uniform.

11. An apparatus according to claim 10, wherein said process means includes conversion means for performing a one-to-one mapping conversion to data which is simultaneously communicated by said communication means, following spreading by said spread means.

12. An apparatus according to claim 11, wherein said process means includes setting means for desirably setting a conversion rule of said conversion means.

13. An apparatus according to claim 10, wherein said process means includes inversion means for inverting predetermined bits of data included in the parallel data.

14. An apparatus according to claim 13, wherein said process means includes setting means for desirably setting bits which are to be inverted.

15. An apparatus according to claim 13, wherein said process means includes scramble means for scrambling the parallel data.

16. An apparatus according to claim 10, further including setting means for desirably setting the plurality of spread codes.

17. An apparatus according to claim 10, wherein said process means processes the parallel data such that a spectrum, when parallel data frequently and continuously communicated are spread, becomes uniform.

18. An apparatus according to claim 10, wherein said process means processes the parallel data such that the spectrum of the signal becomes uniform when predetermined data is communicated.

* * * * *

UNITED STATES PATENT AND TRADEMARK OFFICE
CERTIFICATE OF CORRECTION

PATENT NO. : 5,796,774

DATED : August 18, 1998

INVENTOR(S) : ICHIRO KATO

It is certified that error appears in the above-identified patent and that said Letters Patent is hereby corrected as shown below:

COLUMN 1

Line 18, "series-such" should read --series such--.

COLUMN 5

Line 28, "eleminated" should read --eliminated--.

COLUMN 6

Line 1, "conversion" should read --conversion is--.
   Line 2, "outputs" should read --output--.

COLUMN 8

Line 17, "a" (first occurrence) should read --A--.

Signed and Sealed this

Twenty-fifth Day of May, 1999

Attest:

Q. TODD DICKINSON

*Attesting Officer*     *Acting Commissioner of Patents and Trademarks*